UNITED STATES PATENT OFFICE 2,637,085

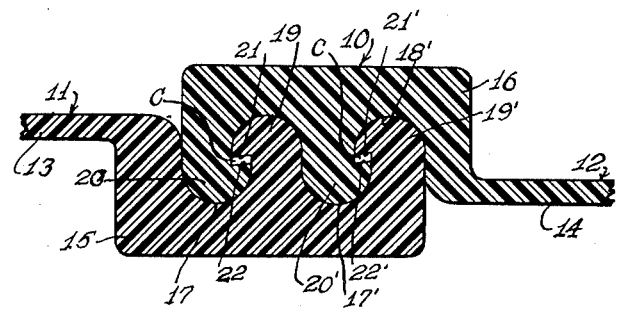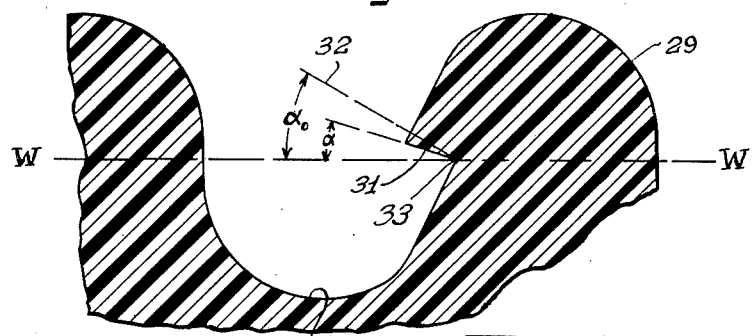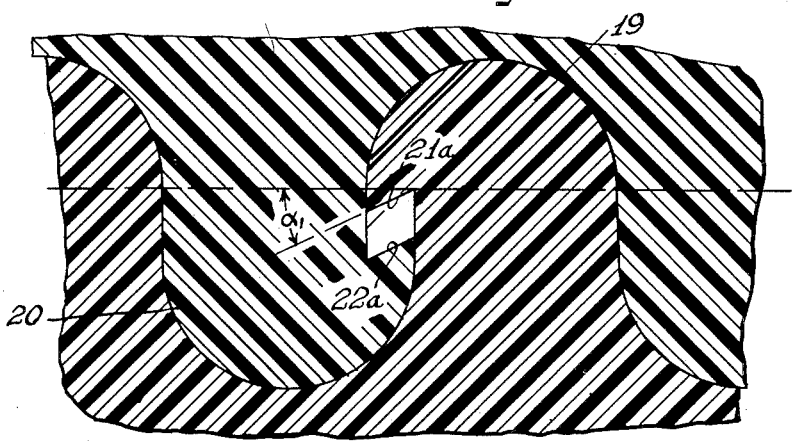

SEPARABLE FASTENER

Börge Madsen, Copenhagen, Denmark, assignor, by mesne assignments, to Flexigrip, Inc., New York, N. Y., a corporation of New York Application December 13, 1950, Serial No. 200,661
In Denmark December 14, 1949

2 Claims. (Cl. 24—201)

This invention relates to clasp fasteners of the type comprising two strips of an elastic or resilient material, each of which is provided with a plurality of grooves and ridges extending lengthwise of the strips with their major depth and height axes substantially perpendicular to the planes of the respective strips, said ridges being provided with hook-like projections forming shoulders adapted to oppose one another and thereby resist forces tending to separate the strips and open the fastener.

It has been found that the previously known fasteners of this kind suffer the drawback that the two interengaging components may relatively easily become disengaged when the fastener is subjected to repeated bending or flexing, in a lengthwise direction, i. e., around an axis in or parallel to the plane of the strips and at right angles to the direction of the ridges and grooves. Under such bending or flexing action, a pressure will be exerted in a direction normal to the planes of the strips tending to separate the two components by forcing the ridges from the grooves.

An object of the present invention is to overcome this drawback by shaping the outline of said shoulders of the ridges in such a manner that a firm frictional engagement therebetween is set up under the action of the forces tending to separate the two components when subjected to bending and which efficiently counteracts such tendency.

According to the present invention, the shoulders previously referred to are provided with substantially plane surfaces. These surfaces are arranged at such an angle with respect to forces normal to the planes of the strips tending to cause relative sliding movement therebetween that is less than the angle of friction of rest, or angle of repose. Each of the surfaces in an opposed pair of surfaces has the same angle of slope and is, therefore, parallel to the other surface of the pair.

Owing to this disposition of the plane, opposed surfaces of the hook-like projections or shoulders, a pressure directed normal to the planes of the strips and tending to disengage the two interengaging components will not cause the two surfaces when brought into abutting relationship to slide relatively to one another until the pressure has increased to such an extent that the ridges themselves become deformed and are bent laterally sufficiently to alter the inclination of the surfaces and allow for sliding of the two abutting surfaces relative to one another.

It will thus be appreciated that a comparatively large force normal to the plane of strips is required to force the two interengaging strips out of engagement, whereas in the previously known fasteners of this general type such disengagement could be effected by a relatively small force owing to the fact that even a small force acting normal to the planes of the strips will cause the two abutting surfaces to slide relatively to one another, thereby producing a wedging effect causing lateral deflection of the ridges.

Moreover, the fact that the two plane surfaces have the same inclination with respect to the planes of the strips provides for an increase in the relative friction between the two interengaging components when the surfaces are brought into abutment. When a pull is exerted upon the two strips tending to separate the two components one from the other, the inclined surfaces of the interengaging shoulders will still remain in abutment during deformation of the ridges.

The details of the invention will be better understood from the following description with reference to the drawings, in which:

Figure 1 illustrates a sectional view taken transversely of the fastener in interengaged or closed position;

Figure 2 is an enlarged fragmentary sectional view of one ridge and the adjacent groove in one component of the fastener; and Figure 3 is a sectional view similar to Figure 2 showing two interengaging ridges belonging to separate components in a modified form of the fastener, with the fastener in closed position.

The fastener of my invention is indicated generally by the reference numeral 10 and comprises two identical strips 11 and 12 formed of a resilient material, such as a thermoplastic material, which may be molded or extruded into the desired finished shape. Each strip 11 and 12 comprises a plane web portion 13 and 14, respectively, and a thickened marginal portion 15 and 16, respectively. Each of said thickened marginal portions is provided with parallel grooves, or channels, 17, 17', and 18, 18', respectively, and with parallel ridges, or projections, 19, 19' and 20, 20', respectively. The channels 17, 17' in the marginal portion 15 correspond with the ridges 20, 20' in the marginal portion 16, and vice versa. The depth and height axes of said channels and ridges are perpendicular to the plane of their respective web portions 13 and 14.

Each of the ridges 19, 19' is provided with a tooth-like projection providing a shoulder 21, 21', and each of the ridges 20, 20' is similarly provided with a shoulder 22, 22'. Said shoulders are constituted by plane surfaces, which, when the fastener is in its normal, closed position, are slightly spaced from one another to provide clearances C and C' between the respective opposed surfaces 21 and 22 and 21' and 22'. These clearances C and C' are left between the opposed plane surfaces of the shoulders in order to facilitate the introduction of the ridges into the complementary grooves or channels while engagement of the two strips 11 and 12 is being effected. Also, after the interengagement of the two strips 11 and 12 has been effected, the clearances C and C' allow lengthwise flexing of the strips to take place to a limited extent before the forces causing flexing tend to exert any separating effect upon the strips.

The characteristic feature of the present invention resides in the disposition of the sloping shoulder surfaces 21, 21' and 22, 22'. These surfaces are inclined at such an angle to the planes of the web portions 13 and 14 that forces acting normal to such planes cannot cause relative sliding movement between said surfaces. This may be best understood by reference to Figure 2.

In Figure 2, there is shown a single ridge 29 and its adjacent groove 30. Said ridge 29 is provided with a tooth-like projection overhanging said groove 30 and constituted by a plane surface 31 overhanging said groove 30. Said plane surface 31 is inclined at an angle $a$ to a plane W—W that is parallel to the planes of the webs 13 and 14. The dash and dot line 32, drawn through the intersection 33 at the lower end of the surface 31 between said surface, the surface of the groove 30 and the plane W—W, defines with said plane W—W an angle indicated by the symbol $a_0$, which represents the angle of friction of rest, or the angle of repose. The angle $a_0$ is, then, that angle at which there will be no relative sliding movement between surfaces abutting along the plane of the line 32 under the action of forces normal to the plane W—W. Since the actual angle of inclination of the surface 31, indicated by the symbol $a$, is less than the angle of repose $a_0$, there can be no relative sliding movement between the surface 31 and the abutting surface of the shoulder of the other tooth-like projecting portion under the action of forces normal to the plane W—W until the angle of inclination of said abutting surfaces is increased due to deformation of the material of the fastener. This same condition obtains wherever the angle between the plane surfaces of the shoulders and the plane W—W, which is parallel to the planes of the web portions 13 and 14, is equal to or less than the angle $a_0$, representing the angle of friction of rest, or the angle of repose. The expression used herein and in the claims, "less than the angle of repose" means less than the angle $a_0$ as determined for any particular fastener, since the angle of repose will vary depending upon the particular composition of material used in making the fastener and upon the surface characteristics thereof.

The term "less than the angle of repose" is also intended to include negative angles such as are illustrated in Figures 1 and 3, where the surfaces are reentrant surfaces. Figure 3 illustrates a pair of ridges 20 and 19 in the position that they would occupy when the component parts of the fastener are interengaged, that is, when the fastener is closed. In that position, the opposed plane surfaces 21a and 22a are slightly spaced from one another and parallel. As illustrated, said surfaces 21a and 22a are inclined at a negative angle with respect to the plane W—W so that the angle $a_1$ in this case, being a negative angle, may also properly be considered as less than the angle of repose represented by the angle. Reentrant surfaces such as the surfaces 21a and 22a are therefore intended to be included within the scope of the term "less than the angle of repose," as used herein.

The cross sections of the two interengaging components of the fastener of my invention need not necessarily be identical as illustrated in the drawings. In fact, the ridges in the two components may be of different shape without departing from the scope of the invention, provided that the walls of the shoulders have the same inclination with respect to the planes of the strips, or marginal web portions, so as to lie against one another when the components are being deformed by exerting a pull normal to the planes of the strips tending to separate the same.

I claim:

1. A fastener comprising a pair of flexible strips, each strip having a plane web portion and a thickened marginal portion, each marginal portion having parallel channels and ridges alternating with each other, the channels in one of said marginal portions corresponding in shape to the ridges in the other and vice versa, the depth and height axis of said channels and ridges being perpendicular to the plane of their respective web portions, each of said ridges having a projecting portion providing a substantially plane surface overhanging the adjacent channel on the same marginal portion, the plane surface on each projecting portion sloping at an angle to the planes of said web portions less than the angle of repose and pairs of said surfaces being in slightly spaced opposed relationship when said ridges and said channels are in normal interfitting relationship, whereby when said strips are subjected to bending while the fastener is closed the opposed surfaces of each of said pairs are brought into contact to resist any tendency toward separation of said strips.

2. A fastener comprising a pair of flexible strips, each strip having a plane web portion and a thickened marginal portion, each marginal portion having parallel channels and ridges alternating with each other to provide an interfitting relationship between the channels of one strip and the ridges of the other and vice versa when the fastener is closed, the depth and height axis of said channels and ridges being normal to the planes of their respective web portions, each of said ridges having a projecting portion adjacent the groove in the same marginal portion and providing a plane surface overhanging said groove, pairs of such plane surfaces being arranged when the fastener is closed in slightly spaced parallel relationship and at an angle to the planes of the web portions less than the angle of repose, whereby oppositely applied forces acting normal to the planes of said webs to effect disengagement cause the plane surfaces in each of said pairs first to move into abutting relationship and then to resist such disengagement.

BÖRGE MADSEN.

References Cited in the file of this patent

UNITED STATES PATENTS

| Number | Name | Date |
|---|---|---|
| 1,887,741 | Trotter | Nov. 15, 1932 |
| 2,558,367 | Madsen | June 26, 1951 |